US011214141B2

(12) United States Patent
Yagura

(10) Patent No.: US 11,214,141 B2
(45) Date of Patent: Jan. 4, 2022

(54) VEHICLE LID DEVICE

(71) Applicant: NIFCO INC., Yokosuka (JP)

(72) Inventor: Seiji Yagura, Yokosuka (JP)

(73) Assignee: NIFCO INC., Yokosuka (JP)

( * ) Notice: Subject to any disclaimer, the term of this patent is extended or adjusted under 35 U.S.C. 154(b) by 187 days.

(21) Appl. No.: 16/630,260

(22) PCT Filed: Jul. 10, 2018

(86) PCT No.: PCT/JP2018/025998
§ 371 (c)(1),
(2) Date: Jan. 10, 2020

(87) PCT Pub. No.: WO2019/013193
PCT Pub. Date: Jan. 17, 2019

(65) Prior Publication Data
US 2020/0130505 A1 Apr. 30, 2020

(30) Foreign Application Priority Data
Jul. 14, 2017 (JP) .............................. JP2017-137908

(51) Int. Cl.
*B60K 15/05* (2006.01)
(52) U.S. Cl.
CPC ........ *B60K 15/05* (2013.01); *B60K 2015/053* (2013.01); *B60K 2015/0515* (2013.01)
(58) Field of Classification Search
CPC .............. B60K 15/05; B60K 2015/053; B60K 2015/0515
See application file for complete search history.

(56) References Cited

U.S. PATENT DOCUMENTS

| 5,944,218 | A | 8/1999 | Mittelhäuser | |
|---|---|---|---|---|
| 7,566,089 | B2 * | 7/2009 | Alfaro | B60K 15/05 |
| | | | | 280/853 |
| 9,132,732 | B2 * | 9/2015 | Yamashita | H01M 50/148 |
| 9,327,594 | B2 * | 5/2016 | Georgi | E05B 83/34 |
| 9,682,619 | B2 * | 6/2017 | Betzen | B60K 15/05 |
| 9,878,613 | B2 * | 1/2018 | Yang | B60K 15/05 |
| 10,384,534 | B2 * | 8/2019 | Guardianelli | E05B 83/34 |

(Continued)

FOREIGN PATENT DOCUMENTS

DE 29605297 U1 5/1996
JP H05-63944 U 8/1993
(Continued)

OTHER PUBLICATIONS

PCT/ISA/210, "International Search Report for International Application No. PCT/JP2018/025998," dated Oct. 9, 2018.
(Continued)

*Primary Examiner* — Nicolas A Arnett
(74) *Attorney, Agent, or Firm* — Manabu Kanesaka

(57) ABSTRACT

A vehicle lid device includes a housing disposing a fueling port or an electrical charging port inside an opening; and a lid turnably connected to a housing side, and opening and closing the opening of the housing. A connection portion between the housing side and the lid side includes a fitting portion for a shaft and a hole, and in a fully open position of the lid, when an external force at a predetermined value or above is applied in an opening direction to further open the lid, fitting of the fitting portion is released.

6 Claims, 12 Drawing Sheets

(56) References Cited

U.S. PATENT DOCUMENTS

| | | | |
|---|---|---|---|
| 10,513,174 B2 | 12/2019 | Watanabe | |
| 10,767,401 B2* | 9/2020 | Lee | E05B 85/26 |
| 10,899,243 B2* | 1/2021 | Kang | E05D 3/022 |
| 2002/0021017 A1* | 2/2002 | Foltz | B60K 15/05 |
| | | | 296/97.22 |
| 2006/0284440 A1* | 12/2006 | Leitner | B60K 15/0406 |
| | | | 296/97.22 |
| 2009/0309386 A1* | 12/2009 | Yamamoto | B60K 15/0406 |
| | | | 296/97.22 |
| 2013/0095678 A1* | 4/2013 | Hara | B60L 53/18 |
| | | | 439/136 |
| 2016/0263994 A1* | 9/2016 | Brown | B60K 15/05 |
| 2016/0280061 A1* | 9/2016 | Desai | B60K 15/04 |

FOREIGN PATENT DOCUMENTS

| | | |
|---|---|---|
| JP | 2012-232707 A | 11/2012 |
| JP | 2013-095335 A | 5/2013 |
| JP | 2016-094096 A | 5/2016 |
| JP | 2017-47827 A | 3/2017 |
| WO | 2015/177421 A1 | 11/2015 |

OTHER PUBLICATIONS

Europe Patent Office, "Search Report for European Patent Application No. 18832613.6," dated Jan. 19, 2021.

* cited by examiner

VEHICLE LID DEVICE

FIELD OF TECHNOLOGY

The present invention relates to a vehicle lid device.

BACKGROUND ART

FIG. 11 and FIG. 12 show a vehicle lid device disclosed in a prior art document (following Patent Document 1) by the present applicant. The lid device 7 includes a housing 1 having a fueling port portion 12; a lid 2 opening and closing an opening of the housing 1; and a link member 4 connecting the lid 2 relative to the housing 1 to be openable and closable. Main essential parts reside in that as the lid device including the housing 1, the lid 2, and the link member 4 connecting the lid to the housing, a member projecting into the housing or a projecting portion can be easily eliminated or reduced such that the link member 4 is pivotally supported by a base member 3 disposed in a housing-side concave portion 14; an excellent assembling property such that the base member 3 is mounted relative to the concave portion 14 through an engagement between an engaging portion 14a and an engaged portion 37 is obtained; and the link member 4 is formed by a first link member 4A and a second link member 4B so as to control a turning track of the lid to be compact, or prevent wobbling of each link member by applying an urging force of an urging device 6 between both the link members as well.

PRIOR ART DOCUMENT

Patent Document

Patent Document 1: Japanese Unexamined Patent Application Publication No. 2017-47827

SUMMARY OF THE INVENTION

Problems to be Solved by the Invention

In a conventional structure including the aforementioned lid device, for example, in a fully open position of the lid shown by a solid line in FIG. 12, in a case of receiving an external force in an opening direction further, there is a possibility such that the link member supporting the lid may break. Also, when the lid turns in the opening direction excessively in this manner, there is a possibility such that a corresponding end portion of the lid may contact a corresponding portion of a body (an outer panel) so as to cause a dent or a scratch as well.

Objects of the present invention are to solve the aforementioned problems, to reliably prevent damage such that structural members become non-reusable, and to prevent a dent or a scratch from being formed on the body as little as possible even in a case of receiving an excessive load in the opening direction further in the fully open position of the lid. Other objects will be clarified in the following explanations.

Means for Solving the Problems

In order to obtain the aforementioned objects, in the first aspect of the present invention, a vehicle lid device comprises a housing disposing a fueling port or an electrical charging port inside an opening; and a lid turnably connected to the housing side, and opening and closing the opening of the housing, wherein a connection portion between the housing side and the lid side includes a fitting portion for a shaft and a hole, and in a fully open position of the lid, when an external force at a predetermined value or above is applied in an opening direction to further open the lid, fitting of the fitting portion is released.

In the first aspect of the present invention, the connection portion between the housing and the lid includes the fitting portion for pivotally supporting the shaft and the hole, and in the fully open position of the lid, when the external force at the predetermined value or above is applied in the opening direction to further open the lid, the fitting of the fitting portion is released, so that an excessive load in the opening direction is mitigated and absorbed so as to avoid the worst situation such that conventional structural members (especially, a link member) become non-usable, or prevent an occurrence of a dent or a scratch on a body, thereby improving a reliability.

The aforementioned present invention may be embodied as specified in the following second to sixth aspects.

(Second Aspect) A structure such that the aforementioned lid is connected and supported relative to the housing through a first link member and a second link member, and when the external force at the predetermined value or above is applied, the fitting of the fitting portion between the second link member and the lid is released, and the fitting of the fitting portion between the first link member and the lid is maintained.

In the second aspect of the present invention, since the link member is formed by two link members, as in Patent Document 1, a turning track of the lid can be easily controlled to be compact. Simultaneously, when the external force at the predetermined value or above is applied, since the fitting of the fitting portion between the second link member and the lid is released, and the fitting of the fitting portion between the first link member and the lid is maintained, the lid releases the fitting of the second link member so as to mitigate and absorb the load, and prevent the worst situation of falling off by the first link member as well.

(Third Aspect) A structure of including an urging member supported in the first link member.

In the third aspect of the present invention, by the urging member supported in the first link member, turning of the lid is assisted by an urging force, or the urging force is applied to the respective link members so as to prevent wobbling of the respective link members. Also, in the second aspect of the present invention, the urging member is supported in the first link member, so that even when the fitting between the second link member and the lid is released, a possibility of falling-off of the urging member can be prevented.

(Fourth Aspect) A structure such that as the aforementioned shaft, the first link member includes a shaft having an approximately D shape in a cross section, and the second link member includes a shaft having an approximately round shape in a cross section which can be released from the fitting easier than the D shape.

In the fourth aspect of the present invention, in the fully open position of the lid, as a structure of allowing the fitting of the fitting portion to be released when the external force at the predetermined value or above is applied in the opening direction to further open the lid, the structure can be easily provided only by making the first link member as the shaft having the approximately D shape in the cross section, and making the second link member as the shaft having the approximately round shape in the cross section which can be released from the fitting easier than the D shape.

(Fifth Aspect) A structure of including a groove portion provided on the aforementioned lid side for allowing the shaft of the second link member to fit again from a state wherein the shaft of the second link member has come off from the aforementioned hole portion.

In the fifth aspect of the present invention, there is included the groove portion provided on the lid side for allowing the shaft of the second link member to fit again from the state wherein the shaft of the second link member has come off from the hole portion, so that in a case wherein the shaft of the second link member has come off, the shaft of the second link member becomes easily recoverable through the groove portion.

(Sixth Aspect) A structure such that the lid is formed by a lid main member to which the first and second link members are connected; and a lid outer mounted on an outer face of the lid main member, and in a case wherein the external force at the predetermined value or above in the opening direction is applied to the lid main member, the lid outer falls off from the lid main member, or moves in a direction of separating from the first and second link members.

In the sixth aspect of the present invention, the lid is formed by the lid main member and the lid outer, and in the case wherein the external force at the predetermined value or above in the opening direction is applied to the lid main member, the lid outer falls off from the lid main member, or moves in the direction of separating from the first and second link members so as to mitigate and absorb a damage on the lid outer.

BRIEF DESCRIPTION OF THE DRAWINGS

FIGS. 1(a) and 1(b) show a lid device of an embodiment in a usual fully open position according to the present invention, wherein FIG. 1(a) is a schematic perspective view; and FIG. 1(b) is a schematic side view simplified by omitting a housing and a lid outer.

FIGS. 2(a) and 2(b) show a state wherein a lid has slightly turned by receiving a load in an opening direction further from the fully open position in FIG. 1(a), wherein FIG. 2(a) is a schematic perspective view; and FIG. 2(b) is a schematic side view simplified by omitting the housing and the lid outer.

FIGS. 3(a) and 3(b) show a state wherein the lid has turned by receiving an excessive load in the opening direction further from FIGS. 2(a) and 2(b), wherein FIG. 3(a) is a schematic perspective view; and FIG. 3(b) is a schematic side view simplified by omitting the housing.

FIGS. 7(a) and 7(b) show a structure of the lid, wherein FIG. 7(a) is a perspective view showing a relation of a lid main member and the lid outer; and FIG. 7(b) is a side view thereof.

BEST MODES OF CARRYING OUT THE INVENTION

Figure 1A:
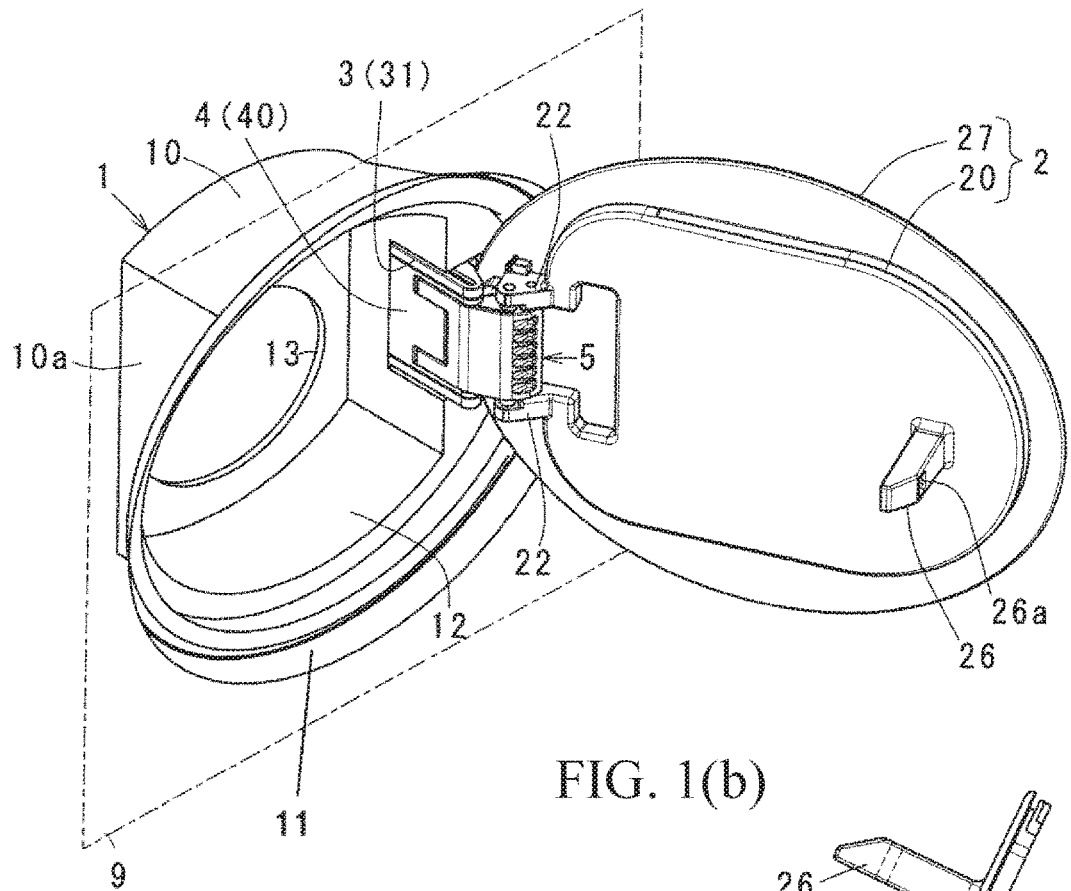

The best embodiment of the present invention will be explained with reference to the attached drawings. In an explanation, after a structure of a vehicle lid device according to the embodiment of the present invention is clarified, operation characteristics will be described. Incidentally, in FIGS. 1(b) and 2(b), and FIGS. 4(a) and 4(b), as a lid 2, a lid outer 27 is omitted. Namely, in this stage, although the lid outer 27 is assembled to a lid main member 20, the lid outer 27 is omitted so as to be simplified in the same manner as in FIG. 3(b) and FIG. 4(c).

(Structure) In FIG. 1(a) to FIG. 6, the lid device comprises an approximately container-like housing 1 dividing a space 12 disposing a fueling port or an electrical charging port and opening upwardly (in a use state, a near side is open); a lid 2 opening and closing an upper opening of the housing 1; a base member 4 held on an inner circumference side of the housing 1 through a fixture frame 3; and first and second link members 5 and 6 which are link members supporting the lid 2 relative to the base member 4 to be openable and closable. Also, the lid 2 is formed by the lid main member 20 and the lid outer 27. Incidentally, the housing 1, the lid 2 (the lid main member 20 and the lid outer 27), the fixture frame 3, the base member 4, and two link members 5 and 6 are respectively resin injection molded members; however, they may be made of materials other than the resin.

In other words, in the lid device, the lid 2 is supported relative to the housing 1 to be turnable through the fixture frame 3 and the base member 4, and two link members 5 and 6. Then, the lid 2 is locked in a closed position shown by imaginary lines of dashed lines in FIG. 1(b) by a lock device (not shown in the drawing) mounted on an outer circumference of the housing 1. For example, the locking is released by releasing the locking through an opener inside a vehicle compartment, or releasing in an association with a release operation of a door lock. From that state, the lid 2 slightly opens from the closed position in FIG. 1(b) against an urging force of an urging device 7 such as a spring and the like by a push lifter (see Patent Document 1) not shown in the drawing. Then, in a middle of turning the lid 2 in an opening direction by hand, an urging direction of the urging device 7 is reversed, and after that, the lid 2 turns in a fully opening direction shown by solid lines in FIG. 1(b) by the urging force of the urging device 7. Details are as follows.

As shown in FIG. 1(a), the housing 1 includes a flange portion 11 protruding on an upper circumference of a cylindrical portion 10, and for example, in the same manner as the Patent Document 1, in a state wherein the cylindrical portion 10 is inserted relative to an attachment frame (not shown in the drawing) attached to a body 9 side of an auto body from an opening of the relevant attachment frame, the housing 1 is mounted through the flange portion 11, a seal member mounted on the flange portion 11, and the like.

Figure 6:
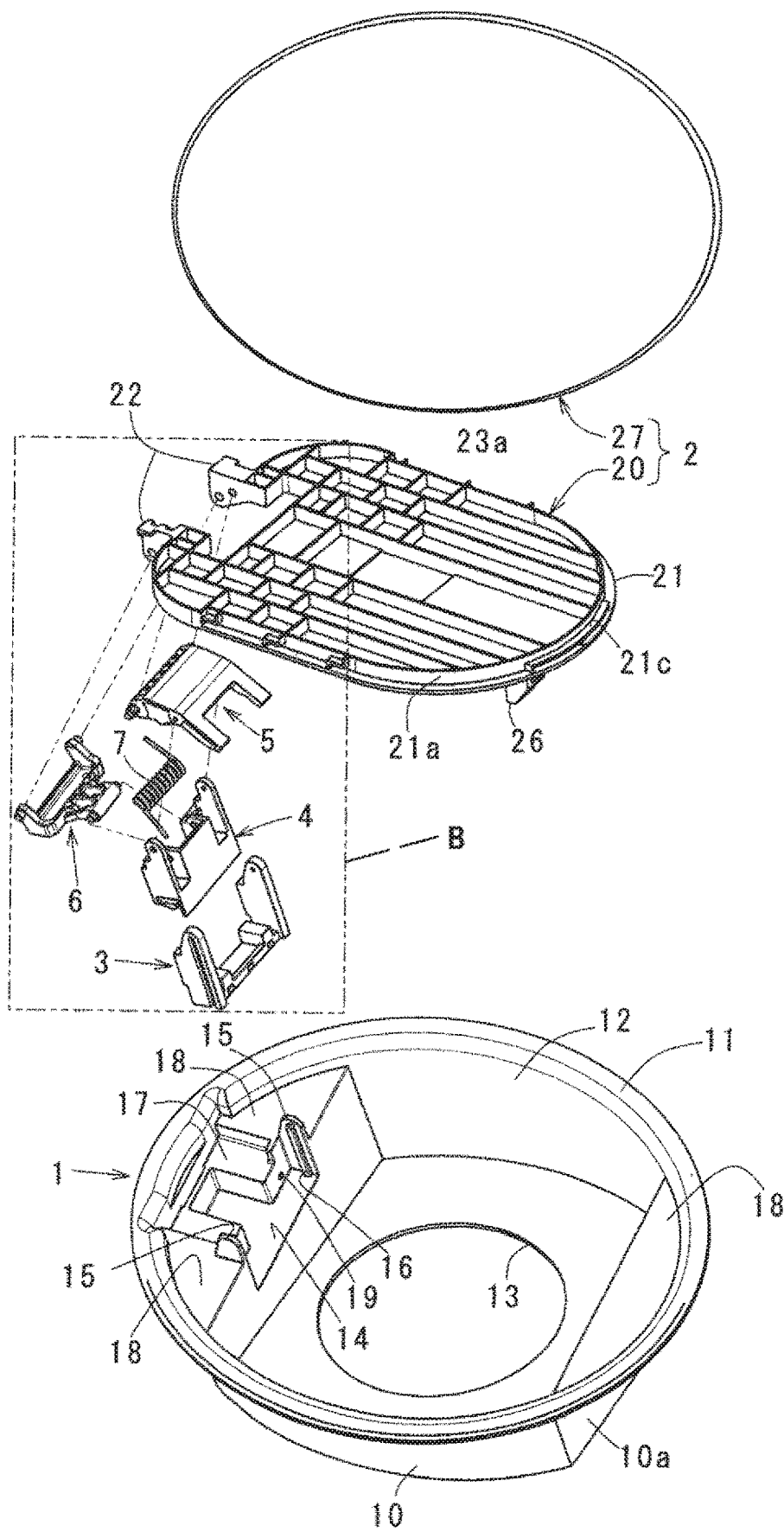
FIG. 6 is a schematic exploded perspective view showing a relation of members of the lid device.

Also, as shown in FIG. 6, the cylindrical portion 10 includes the inside space 12; a circular through hole 13 at a bottom wall; a concave portion 14 provided in an inner circumference and being capable of receiving the fixture frame 3; receiving portions 18 located on an inner circumference, and provided on both sides sandwiching the concave portion 14 and facing the concave portion 14 so as to hold the lid 2 in the closed position; cavity portions 17 wherein one part of the receiving portions 18 on both sides sandwiching the concave portion 14 is formed slightly lower; and an arrangement portion 10*a* provided on a side opposite to the concave portion 14 in the outer circumference.

In the arrangement portion 10*a*, there are disposed the lock device (not shown in the drawings) for engaging/disengaging the lid 2 with/from the closed position, the push lifter (not shown in the drawings) for rising the lid 2 by slightly pushing the lid 2 up when the lid 2 is opened from the closed position, and the like, as necessity. On the other hand, the space 12 is a portion for disposing the fueling port or the electrical charging port. In the through hole 13, for example, there is disposed a connecting pipe for communicating with a fuel tank side, or an electrical charging mechanism portion. In the concave portion 14, there are provided projecting piece portions 15 integrated with inner faces on both sides and projecting upwardly; rail-like convex portions 16 facing each other on both inner faces including the projecting piece portions 15; and attachment holes 19.

Figure 7A:
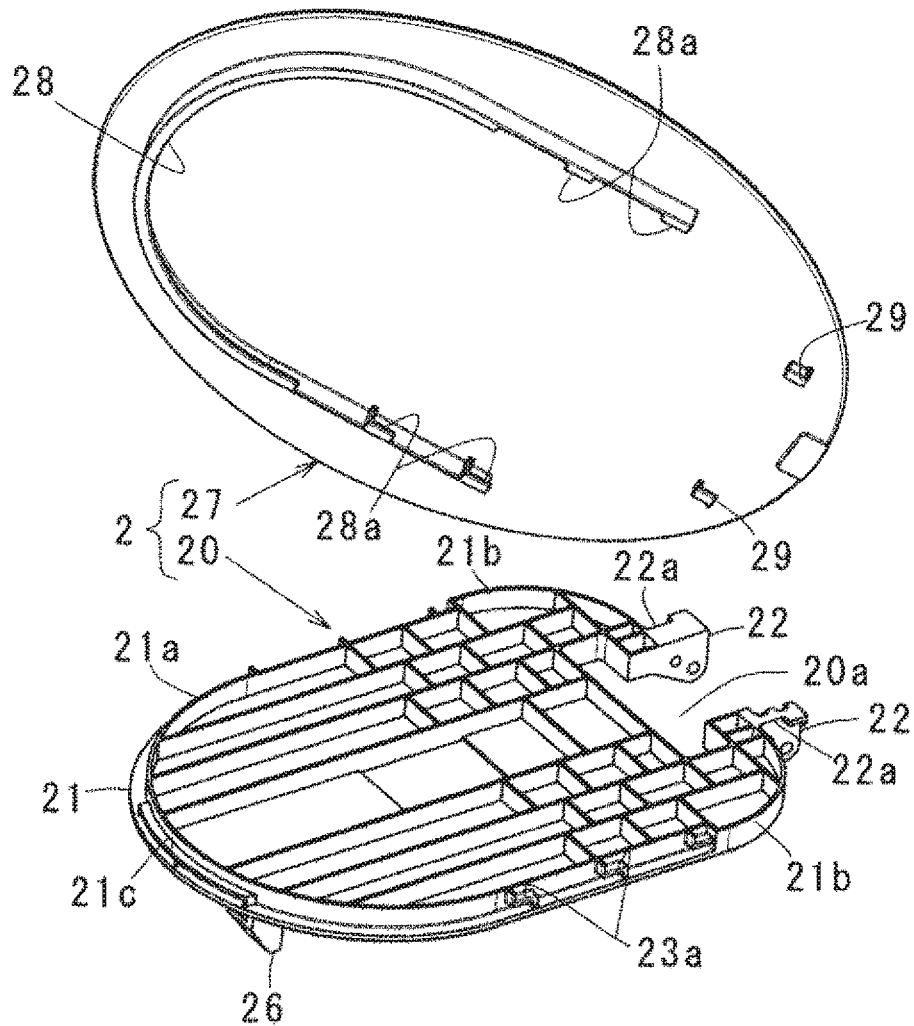
Figure 7B:
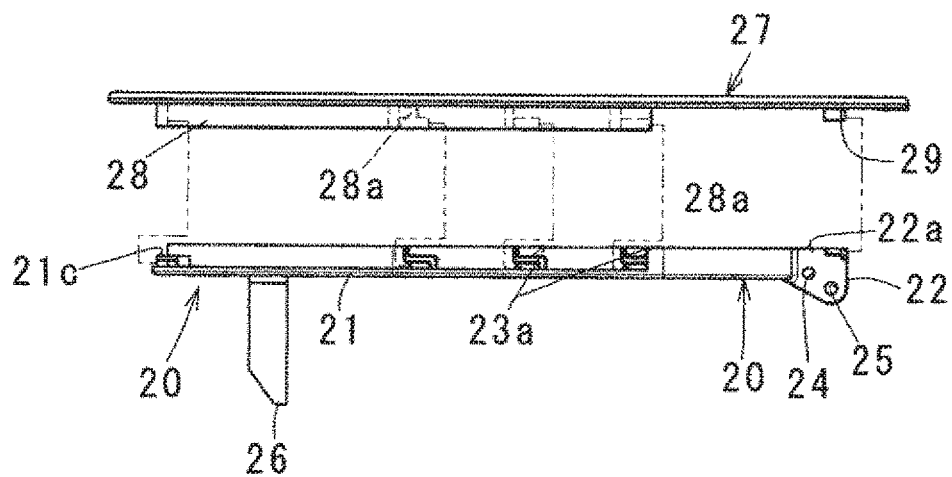
Figure 8A:
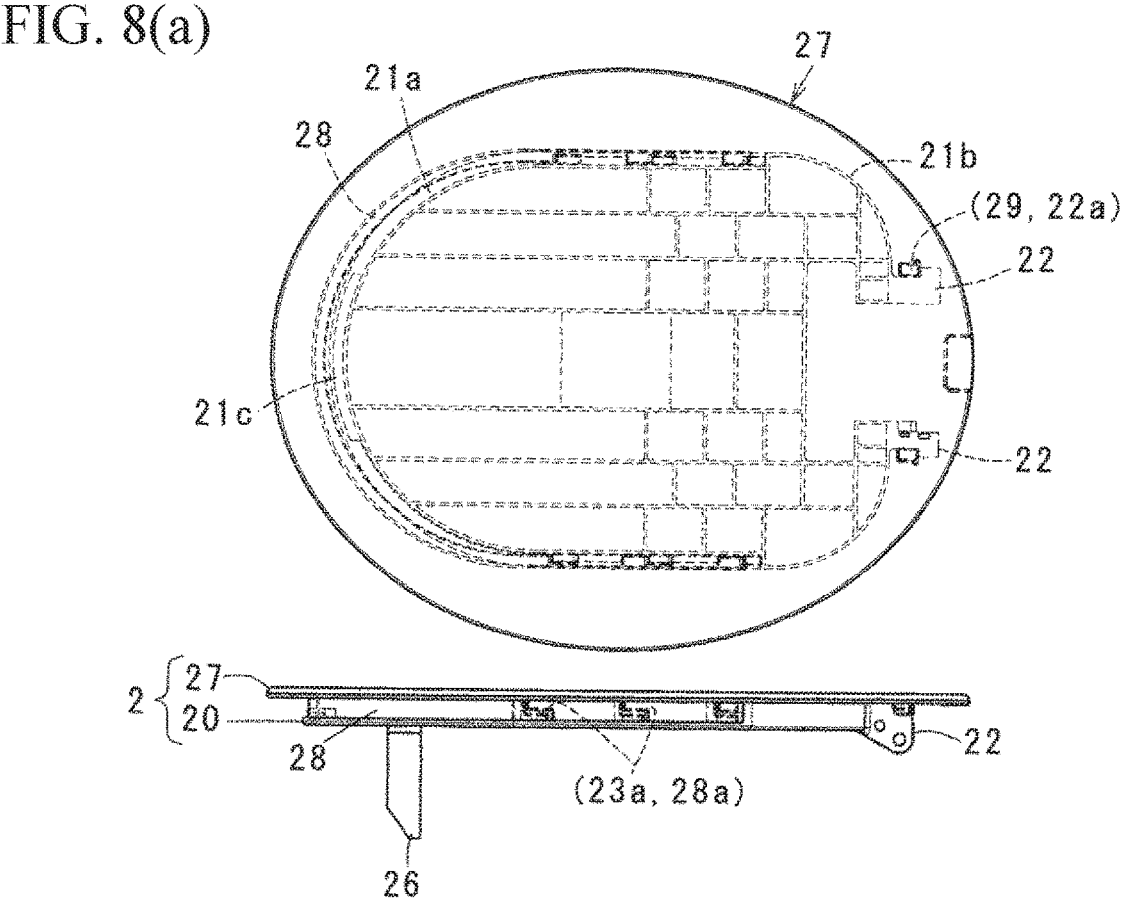
FIG. 8(a) is a top view and a side view of the fully open position in a state wherein the lid outer is assembled to the lid main member.

As shown in FIGS. 7(*a*) and 7(*b*), and FIGS. 8(*a*) and 8(*b*), the lid 2 is formed by the lid main member 20 to which the respective link members 5 and 6 are connected, and the lid outer 27 detachably attached to an outer face of the lid main member 20, and in a fully open position (FIG. 8(*a*)), in a case wherein an external force at a predetermined value or above is applied to the lid main member 20 in the opening direction (FIG. 8(*b*)), the lid 2 is formed such that the lid outer 27 moves in a direction of falling off from the lid main member 20 or separating from the respective link members 5 and 6 by stress receiving from the base member 4, the housing 1, and the like.

Specifically, first, the lid outer 27 forms a design surface of the lid 2, and includes a U-shaped rib 28 located on a circumference side on a lower face and provided on a front side from a middle; a plurality of engaged portions 28*a* provided on both inside facing faces of the rib 28; and a pair of elastic projections 29 provided on a back side. On the other hand, the lid main member 20 provides a pair of arm portions 22 on a back side of a flat plate 21 with a gap 20*a*. On an upper face of the flat plate 21, there are included an arc-shaped rib 21*a* provided on a front-side circumference; arcuate ribs 21*b* provided in both circumference portions on the back side; a rib 21*c* positioned in a middle of right and left and provided on a front side of the rib 21*a*; and many reinforcing ribs provided inside the rib 21*a* and both the ribs 21*b*. Also, there is included a plurality of locking piece portions 23*a* respectively provided on both sides of the rib 21*a*. Each locking piece portion 23*a* forms a locking space opening a front side, and engaging with/disengaging from the corresponding engaged portion 28*a* of the lid outer.

Also, on a lower face of the flat plate 21, an engagement piece 26 projects approximately in a middle of a plate width on a front side. The engagement piece 26 includes a locking hole 26*a* passing through in front and back, and a lock member of the aforementioned lock device is inserted and engaged so as to lock the lid 2 in a closed state. A corresponding portion of the respective link members 5 and 6 is turnably connected to the right-and-left arm portions 22.

Both the arm portions 22 are formed to become thicker up and down as coming to a back end side, and include notch portions 22*a* engaging with/disengaging from the aforementioned elastic projections 29 on an outside face. Consequently, as shown in FIG. 8(*a*), the lid outer 27 is assembled relative to the lid main member 20 by an engagement between the respective locking piece portions 23*a* and engaged portions 28*a* and an engagement between the respective notch portions 22*a* and elastic projections 29 as the lid 2.

Figure 9:
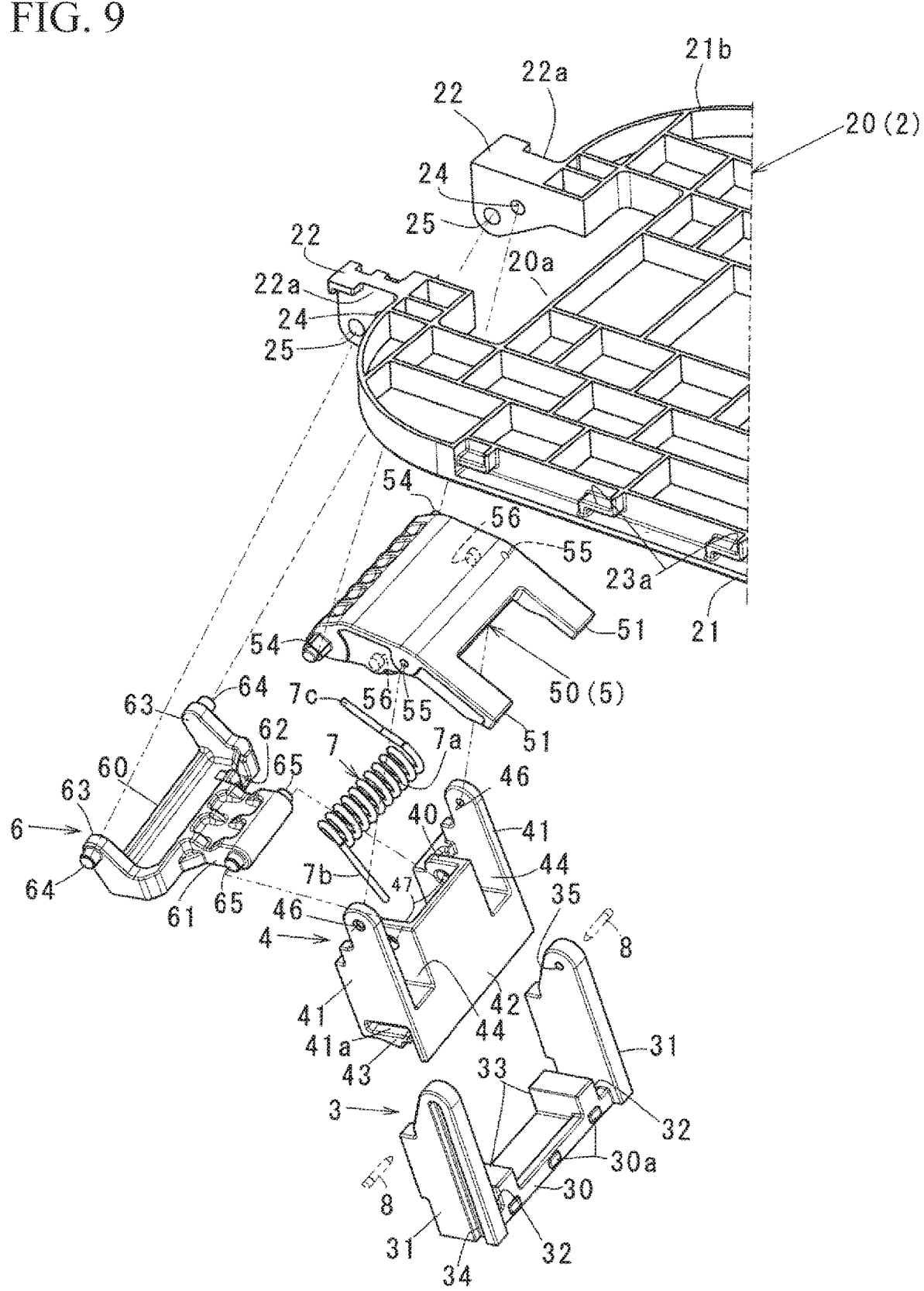
FIG. 9 is a structural view showing a relation of the members wherein a B portion in FIG. 6 is enlarged.
Figure 10A:
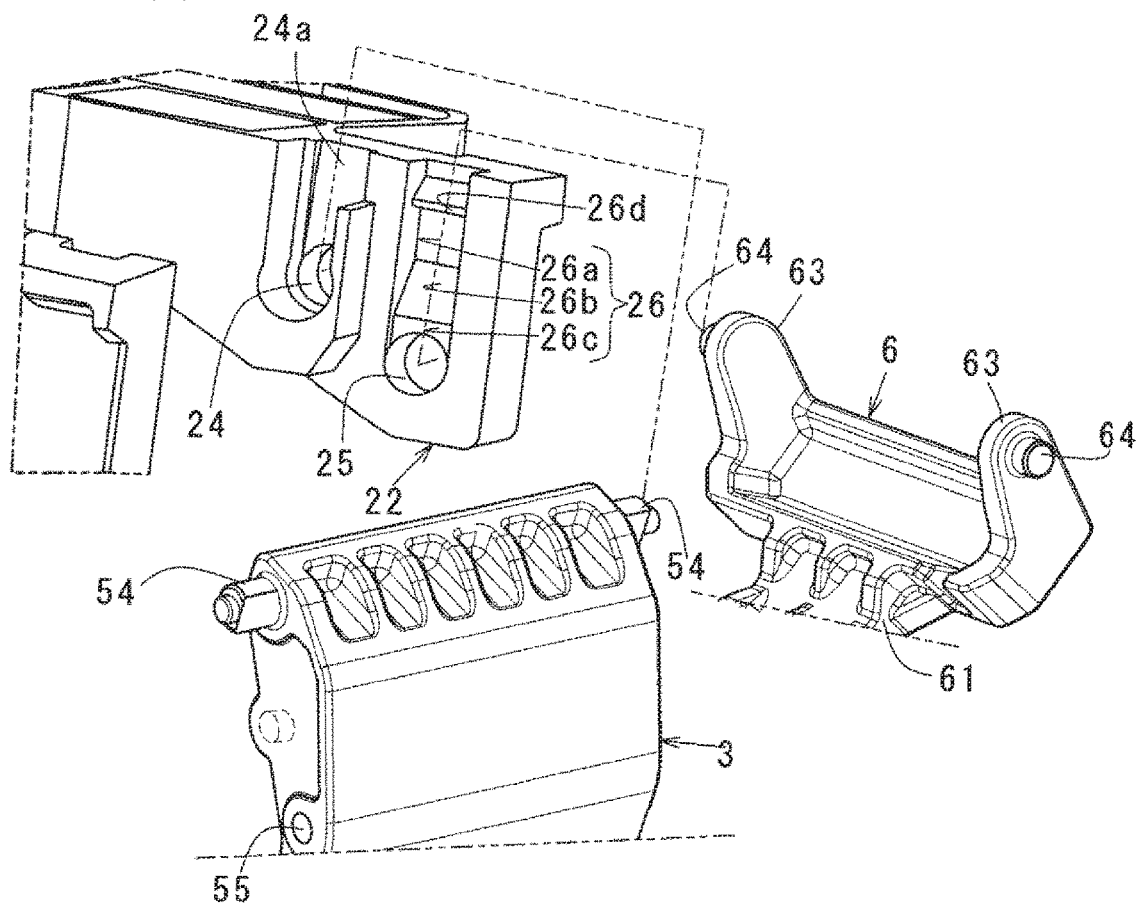
FIG. 10(a) is a diagram showing a shaft structure of a link member.
Figure 10B:
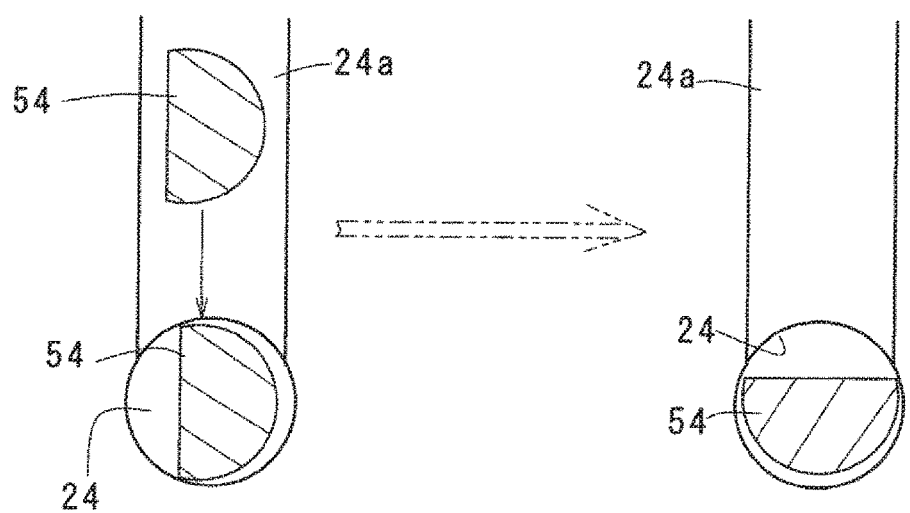
FIG. 10(b) is an explanatory drawing thereof.
Figure 11:
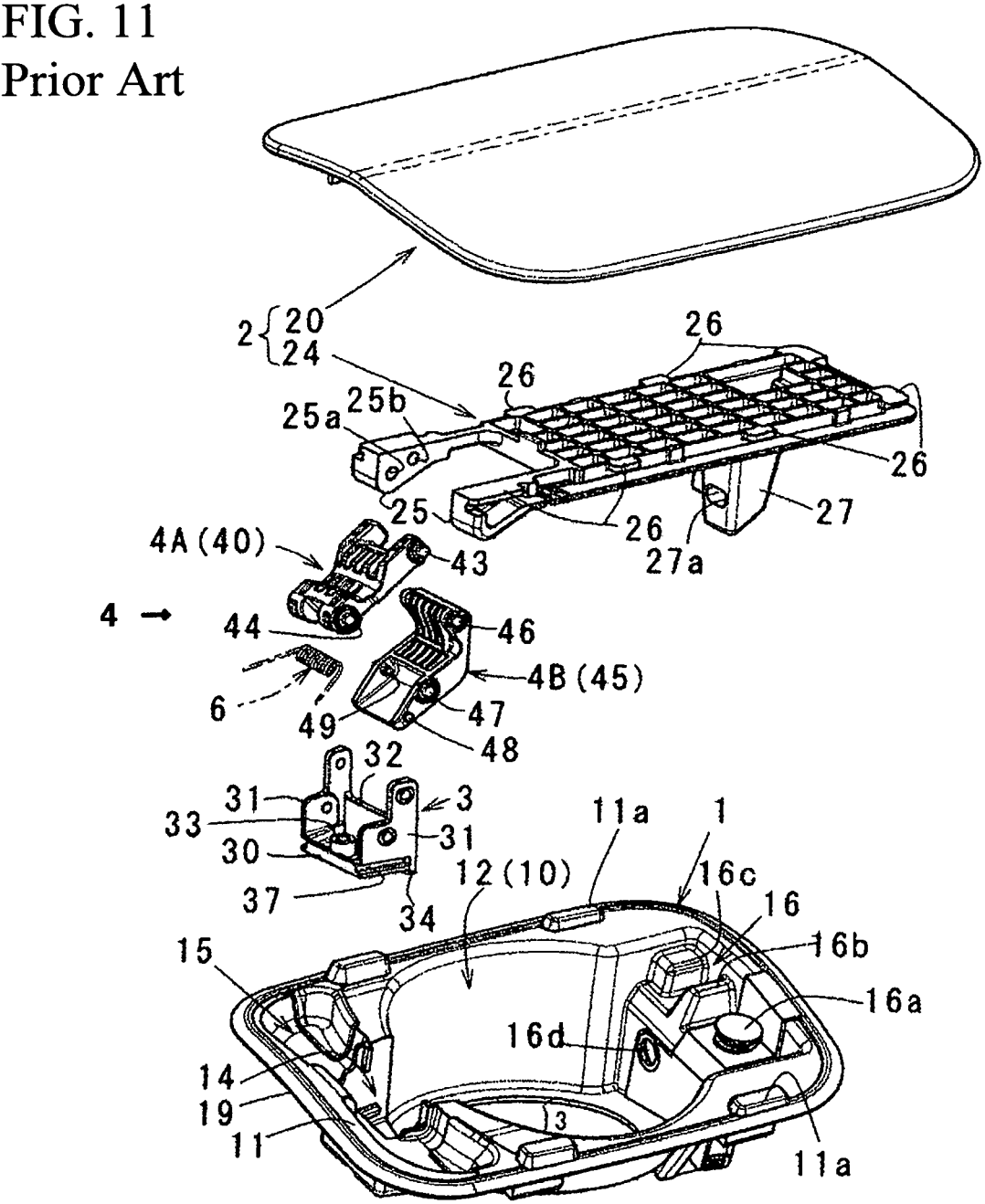
FIG. 11 is a schematic exploded view showing a structure (FIG. 5) of a lid device disclosed in Patent Document 1.
Figure 11:
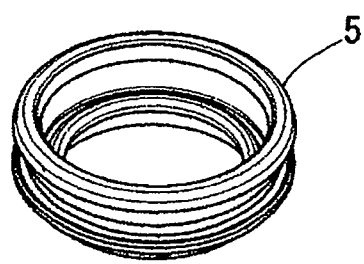
Figure 12:
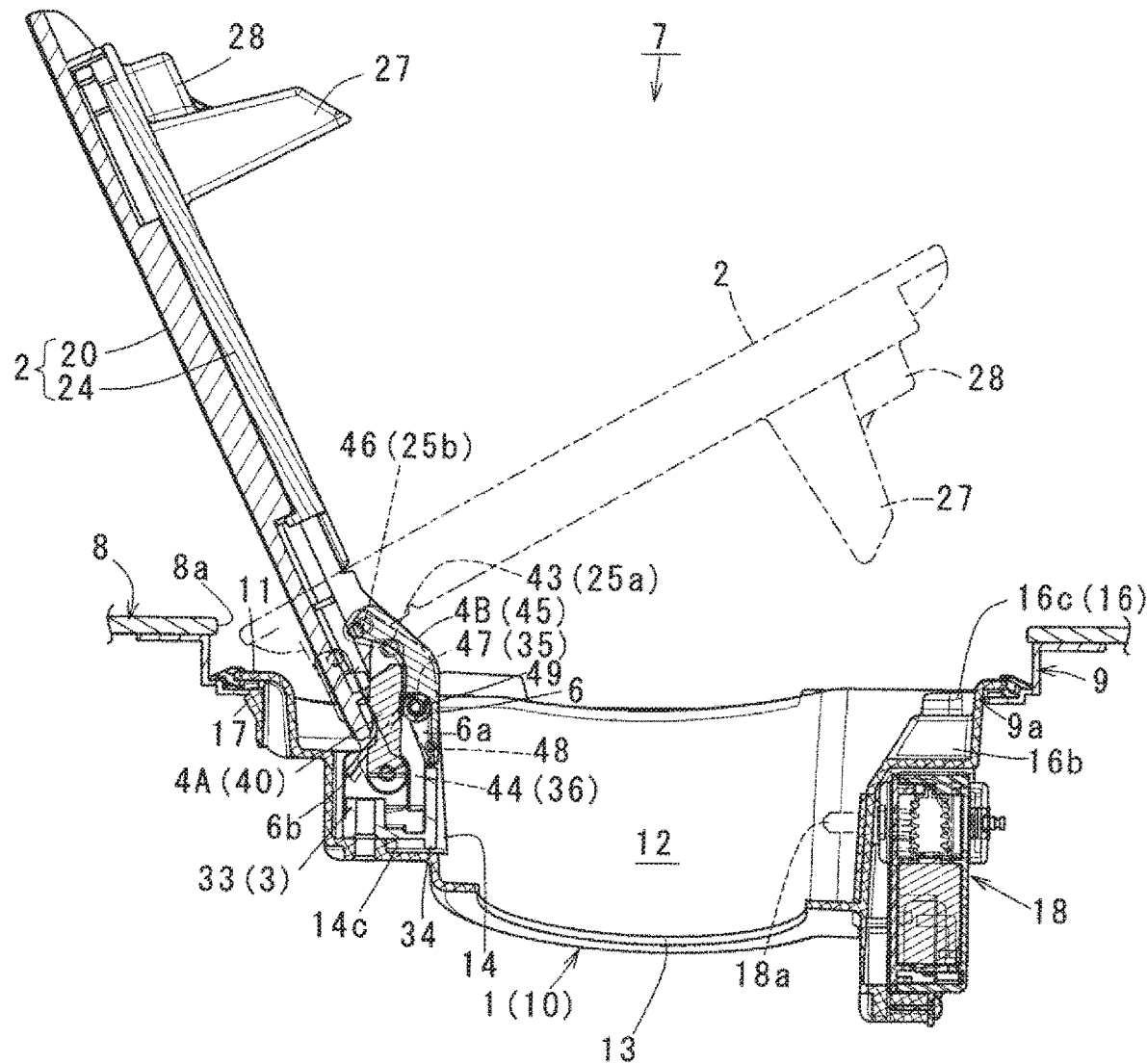
FIG. 12 is a side cross-sectional view showing a structure (FIG. 3) disclosed in the Patent Document 1.

As shown in FIG. 9, on a facing inner face of each arm portion 22, there are provided a hole 24 and a hole 25 in front and back respectively on a coaxial line by maintaining an interval. Among those, as shown in FIGS. 10(*a*) and 10(*b*), the hole 24 is positioned on a front side and a side upper than the hole 25, and engages a corresponding shaft 54 of the later-described first link member 5. The reference numeral 24*a* represents a groove portion for guiding the shaft 54 to the hole 24 from an upper side of the arm portion 22 so as to be fittable. The hole 25 engages a corresponding shaft 64 of the later-described second link member 6. The reference numeral 26 represents a groove portion for fitting the shaft 64 into the hole 25, or for allowing the shaft 64 to fit into the hole 25 again from a state disengaged from the hole 25.

The groove portion 26 includes an insertion portion 26*a* having an upper end open, located between an upper end and the hole 25, and formed in the lowest on an upper end side; a retaining portion 26*c* forming an edge portion of the hole 25, and formed in the highest; and an inclined portion 26*b* formed between the insertion portion 26*a* and the retaining portion 26*c*. The aforementioned structure is one example wherein in a state where the shaft 64 is fitted into the hole 25, when receiving stress in an disengaging direction, the fitting of the shaft 64 is released from the retaining portion 26*c* to the inclined portion 26*b*, and the shaft 64 easily moves to the insertion portion 26*a*. In this structure, on the upper end side of the insertion portion 26*a*, there is further provided a stopper portion 26*d* located higher than the relevant insertion portion for preventing the shaft 64 from coming off. The stopper portion 26*d* is for preventing a shaft portion 65 from completely coming off from the upper end unintentionally even when the fitting of the shaft portion 65 is released from the hole portion 24 so as to move to the insertion portion 26*a*.

As shown in FIG. 9, the fixture frame 3 has an approximately C shape formed by a connection piece 30 and both side pieces 31 which can be housed in the concave portion 14. The connection piece 30 includes a pair of projection portions 33 positioned on an upper face side and provided with gaps 32 between the projection portions 33 and the side pieces 31; attachment holes (not shown in the drawing) provided on a front end face and overlapping with the attachment holes 19 on a housing side; and a plurality of receiving portions 30*a* provided on a back end face. The receiving portions 30*a* have a height which becomes approximately one surface with the back end face of both side pieces 31. In each gap 32, there is provided a locking portion (not shown in the drawing) where an elastic locking piece 43 of the later-described base member engages and disengages. Each side wall 31 includes a longitudinal groove 34 provided on an outer face and extending to just before an upper end from a lower end; and an insertion hole 35 provided on an upper side of each longitudinal groove 34 and passing through on a coaxial line.

The aforementioned fixture frame 3 engages while sliding each longitudinal groove 34 in the corresponding rail-like convex portion 16 so as to be mounted relative to the concave portion 14 on the housing side. Also, as necessity, the fixture frame 3 is fastened and fixed by a fastener such as a screw and the like (not shown in the drawing). In this operation, the fastener is screwed into the attachment holes 19 and the attachment holes provided in the aforementioned connection piece 30 from an outside of the housing 1.

The base member 4 has a size which can be approximately housed inside the C shape of the fixture frame 3, and includes C-shaped inside walls 40 provided in a middle and being capable of accepting a lower portion 61 of the second link member 6; outside walls 41 and 41 provided by maintaining gaps 44 on both sides of the inside walls 40; a back end wall 42 closing between both the outside walls 41; elastic locking pieces 43 provided in a cantilever state on a lower side of the respective outside walls 41; insertion holes 46 provided on an upper side of the respective outside walls 41 and passing through on a coaxial line; and shaft holes 47 provided upper-side facing portions of the inside wall 40 and passing through on the coaxial line.

The aforementioned base member 4 is pushed into the fixture frame 3 such that both the outside walls 41 fit into an inside of the corresponding side pieces 31. Then, in the base member 4, a lower side of the inside walls 40 moveably fits into the corresponding projection portions 33, and the respective elastic locking pieces 43 disengageably engage the locking portions inside the gaps 32. Next, in the base member 4, pins 8 are inserted into the insertion holes 46 on a base member side from the insertion holes 35 on a fixture frame side relative to the fixture frame 3. Then, the base member 4 is supported in the fixture frame 3 in a state wherein the back end wall 42 is positioned between both the side pieces 31 and abuts against the respective receiving portions 30a. Incidentally, structurally, it may be simplified by omitting the fixture frame 3, and directly fixing and placing the base member 4 in the concave portion 14 of the housing.

The first link member 5 and the second link member 6 are turnably supported relative to the base member 4. Namely, as shown in FIG. 9, the first link member 5 has an approximately L shape in a side view, an outer face side is the design surface, and an inner face side becomes an arrangement portion for an urging member. As a shape, the first link member 5 includes a plate portion 50 on an upper side, and leg portions 51 projecting obliquely downward from both lower sides of the plate portion 50. In the plate portion 50, there are provided the shaft portions 54 and 54 projecting on a coaxial line on upper both sides; holes 55 and 55 passing through on a coaxial line on lower both sides; and support shaft portions 56 and 56 provided in a state facing each other on right and left inside the lower both sides. The respective leg portions 51 are disposed in the corresponding gaps 44 on the base member side.

In the aforementioned first link member 5, relative to the base member 4, in a state wherein the holes 55 on both sides are superposed on the corresponding insertion holes 46 of the base member, the pins 8 are turnably fitted into the holes 55 through the insertion holes 35 on the fixture frame side and the insertion holes 46 on the base member side. At that time, as an urging member 7, a coil spring is assembled in a state of holding a winding portion 7a in the support shaft portions 56 on both inner sides, wherein one end 7b is disposed in an inner face of the corresponding leg portion 51, and the other end 7c is disposed inside the gap 44 through a piece portion provided between the outside wall 41 on a corresponding side and the inside wall 40 forming the base member, and connecting therebetween.

On the other hand, as shown in FIG. 9, the second link member 6 is formed by a wide upper portion 60; the narrow lower portion 61; and projecting portions 63 and 63 projecting from both sides of the upper portion 60. On an outer face of the respective projecting portions 63, there is projected the shafts 64 on a coaxial line. On both outside faces of the lower portion 61, there are projected the shafts 65 on a coaxial line.

In the aforementioned second link member 6, relative to the lid main member 20, the respective projecting portions 63 are disposed between the arm portion 22 and the arm portion 22 of the lid, and the shafts 64 are fitted into the corresponding holes 25 to be turnable. Also, the respective shafts 65 on a lower side are fitted and turnably connected to the corresponding holes 47 of the base member.

(Operation) Next, the operation characteristics of the aforementioned lid device are clarified with reference to FIG. 1(a) to FIG. 5, and the like.

Figure 1B:
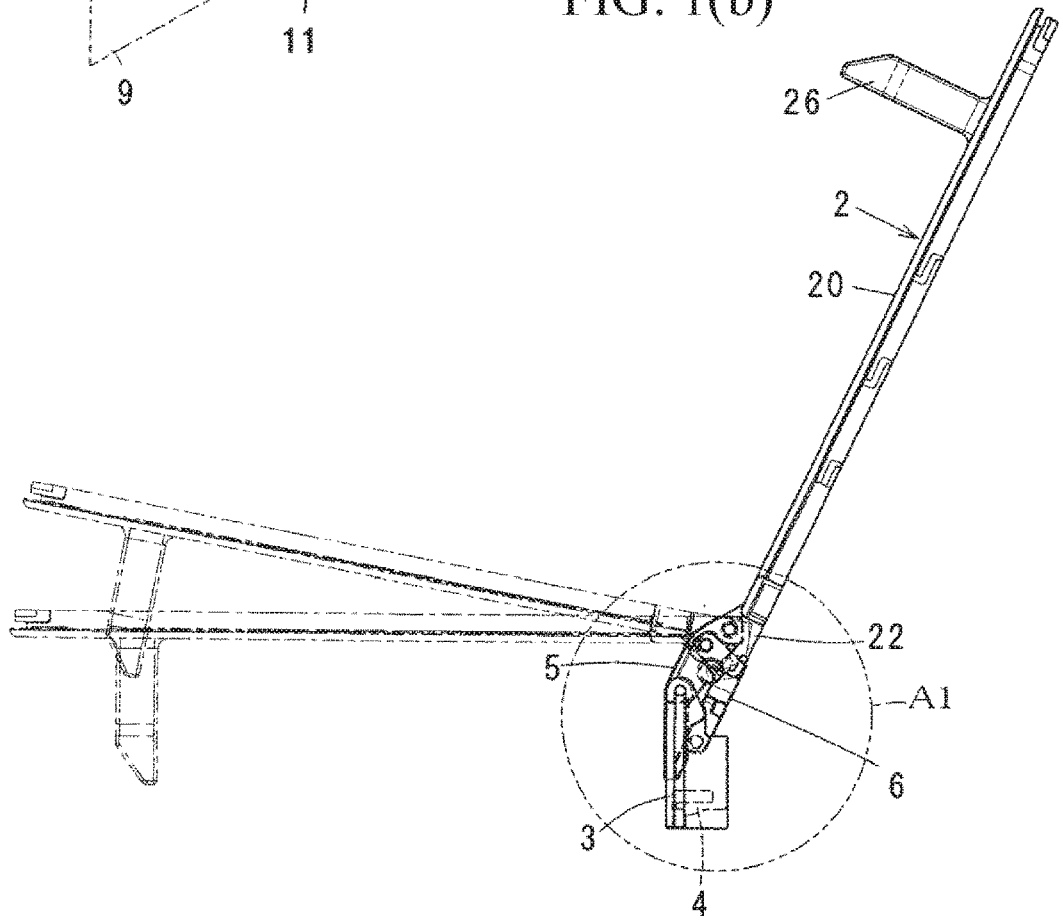

(1) FIGS. 1(a) and 1(b) show a basic operation of the lid device. In FIG. 1(b), the basic operation resides in that the lid 2 is switched between the closed position shown by the dashed lines where the lid 2 becomes approximately a same one face as a body of an auto body, and the fully open position shown by the solid lines; in the closed position, the lid 2 is urged in a closing direction by the urging force of the urging member 7, and is locked by the lock device (not shown in the drawings); when the lock device is unlocked, the lid 2 is pressed in the opening direction against an urging force of an urging device 6 by the push lifter (not shown in the drawings) so as to slightly turn in the opening direction as shown in FIG. 1(b); and from that state, when an operator turns the lid 2 in the opening direction by hand and the like, in a middle (an intermediate position) of turning the lid 2, the urging direction of the urging device 7 is reversed, and after that, the lid 2 turns in the opening direction through the respective link members 5 and 6 by the urging force of the urging device 7 until the lid 2 fully opens.

(2) Also, in the structure, in a fully open state of the lid 2 through the first and second link members 5 and 6, the upper side of the second link member 6 abuts against the inside of the L shape of the first link member 5, and an edge portion on a base end side of the lid outer 27 abuts against the second link member 6, so that the lid 2 is stably held in the fully open position where the lid 2 opens at 90 degrees or more. The structure excels in the appearance because in the fully open position thereof, the second link member 6 is in a state clamped between the lid 2 and the first link member 5 so as to be difficult to be seen; the first link member 5 includes a flat design surface on a space 12 side; and the like. These characteristics are similar to those of the Patent Document 1. Next, specific operations or advantages of the structure will be described.

Figure 3A:
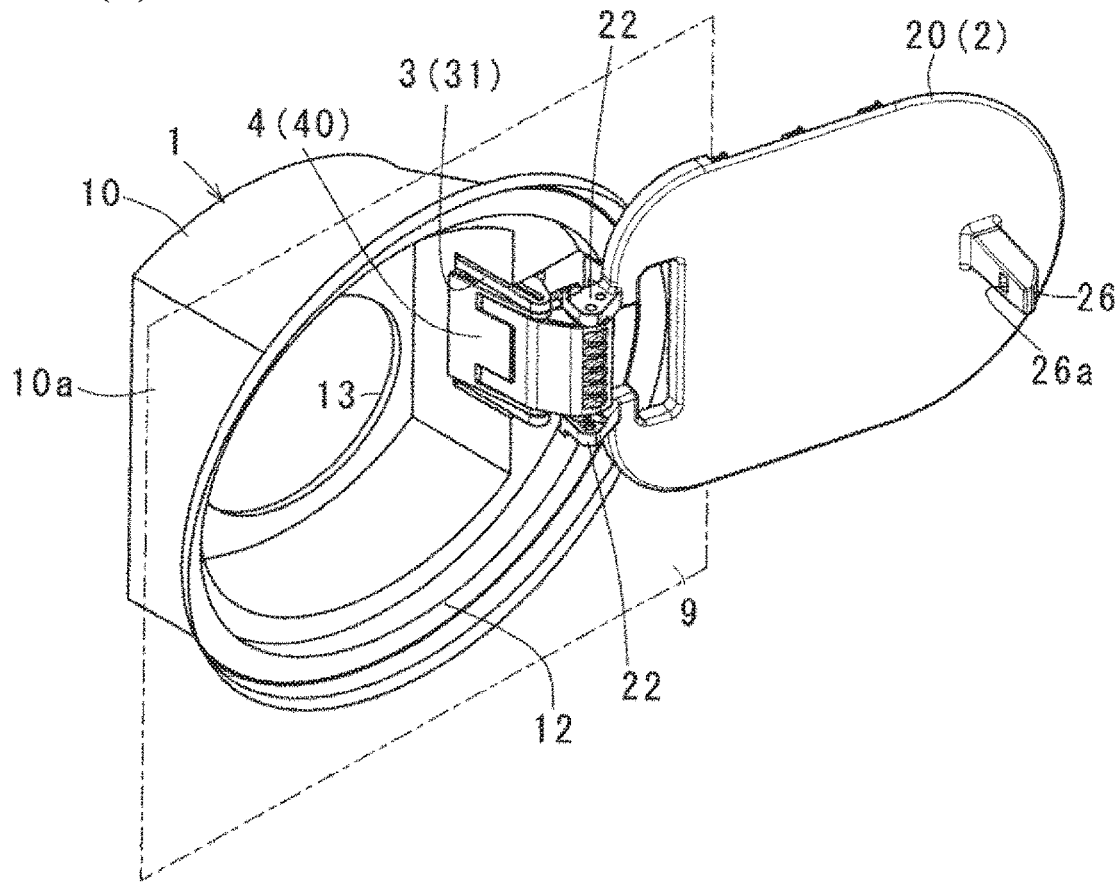
Figure 3B:
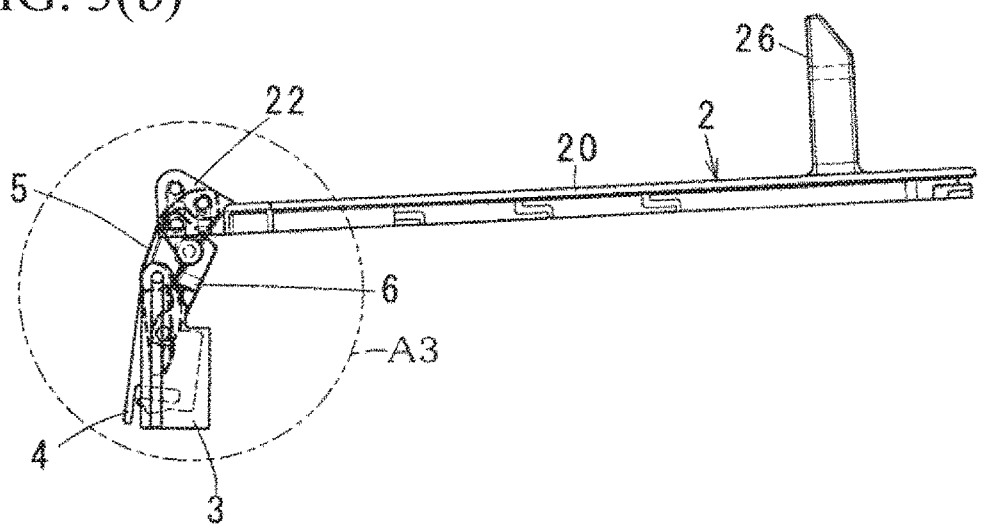
Figure 4A:
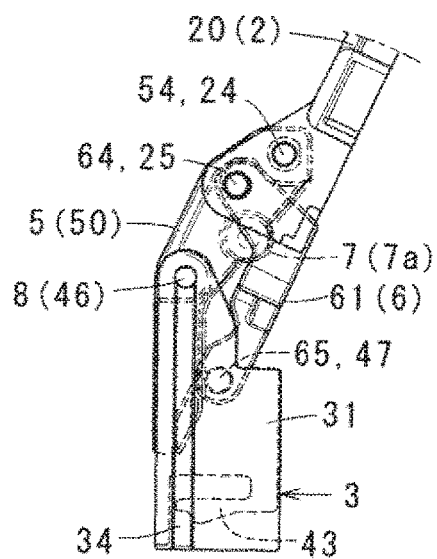
FIG. 4(a) is an enlarged view of an A1 portion in FIG. 1(b)
Figure 4B:
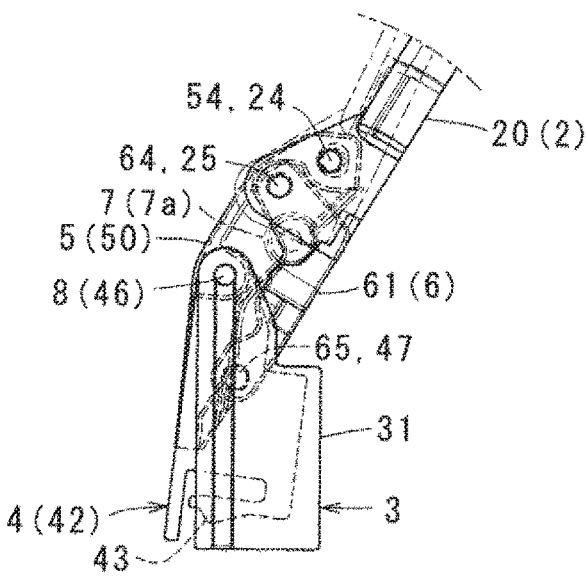
FIG. 4(b) is an enlarged view of an A2 portion in FIG. 2(b)
Figure 4C:
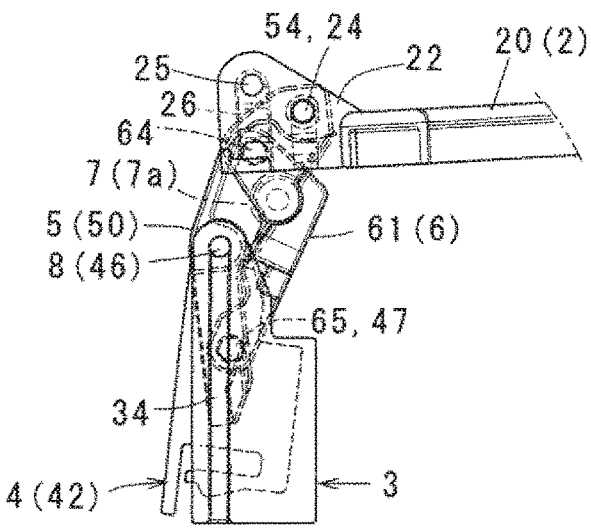
FIG. 4(c) is an enlarged view of an A3 portion in FIG. 3(b).
Figure 5:
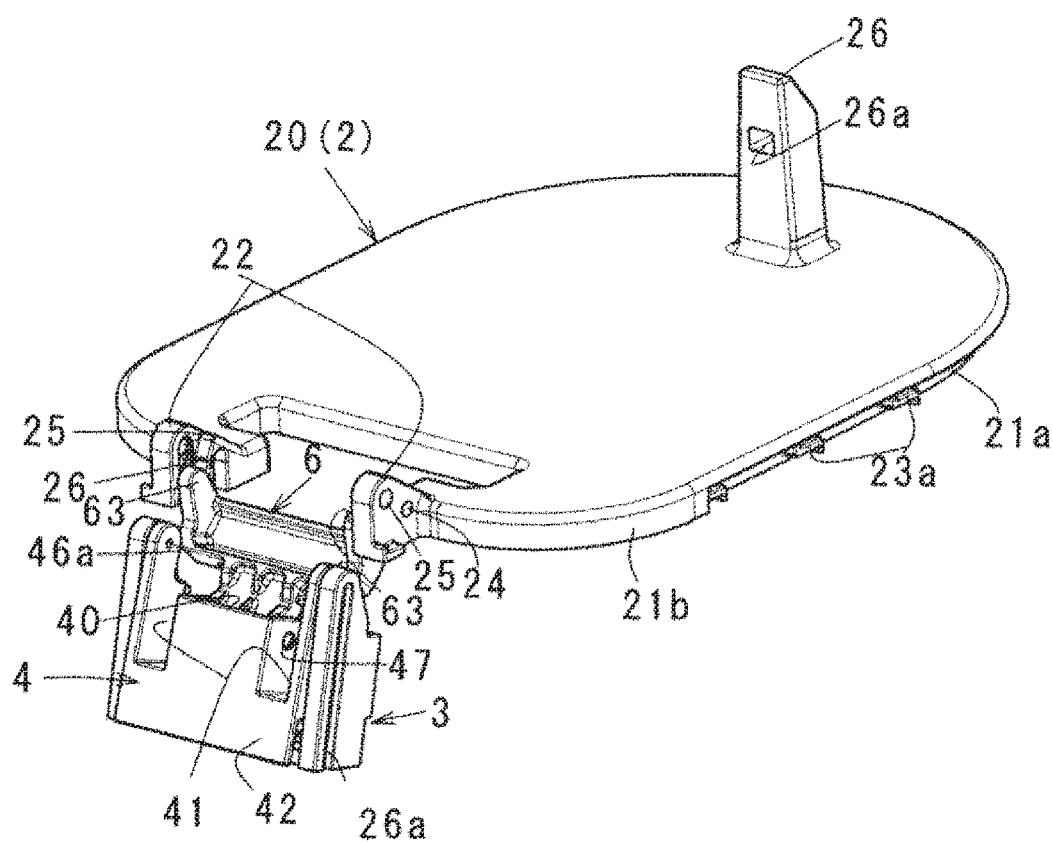
FIG. 5 is a perspective view in a state wherein the lid in FIGS. 3(a) and 3(b) is viewed from a different angle, and the housing and a second link member are omitted.

(3) In the aforementioned lid device, in the fully open position of the lid 2 in FIGS. 1(a) and 1(b), even in a case wherein the lid 2 receives an external force F in the opening direction further, and turns forcibly as shown in FIGS. 3(a) and 3(b), a damage, i.e. a breakage, a dent, a scratch, or the like, that structural members or the body of the auto body receive can be minimized by operations as described hereinafter.

Figure 2A:
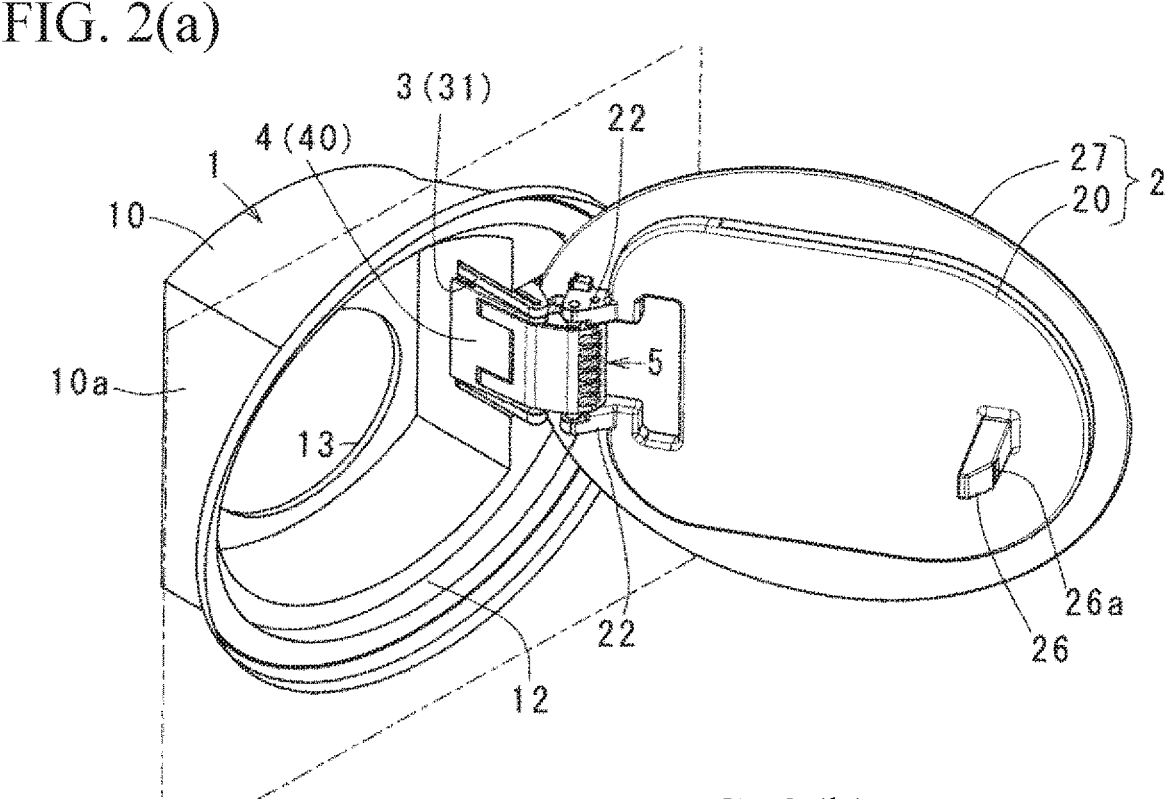
Figure 2B:
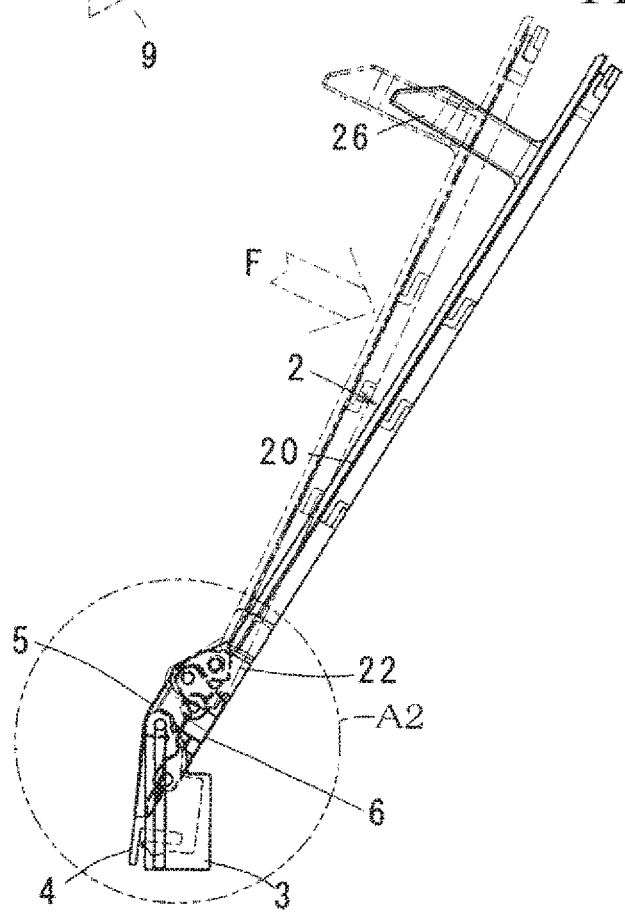

First, in the structure, as shown in FIGS. 2(a) and 2(b) as an example, when the lid 2 receives the external force F in the opening direction further from the fully open position, and slightly turns, the base member 4 receives a load from the respective link members 5 and 6 so as to be slightly turned in a counterclockwise direction as a support point by the pins 8 and to mitigate and absorb the load.

Incidentally, in the base member 4, the elastic locking pieces 43 elastically engage/disengage relative to the locking portions on the fixture frame side, so that the base member 4 can return to an original state only by pushing and operating the base member 4 backward again from a state in FIGS. 2(a) and 2(b). Such an operation becomes effective in preventing the breakage or minimizing the damage on the link members 5 and 6, and the like, by swinging of the base member 4 as the support point by the pins 8 so as to improve a quality and reliability.

Secondly, FIGS. 3(a) and 3(b) show a state wherein the lid 2 has largely turned by receiving an excessive external force in the opening direction further from the state in FIGS. 2(a) and 2(b). In this process, as shown in FIG. 3(b), especially, the respective link members 5 and 6 come close to each other, and hit each other. As a result, the shafts 64 of the upper portion 60 are disengaged from the holes 25, and move to the aforementioned groove portion 26, specifically, the retaining portion 26c, the inclined portion 26b, and the insertion portion 26a in FIG. 10(a). As a result, in the structure, the external force or stress which the lid 2 receives is mitigated and absorbed by the disengagement between the shafts 64 and the holes 25 so as to prevent the breakage or suppress the damage on the link members 5 and 6, and the like.

Incidentally, in the structure, by a presence of the stopper portion 26d, the shafts 64 are not allowed to come off completely from the groove portion 26, so that in a process of turning the lid 2 in the closing direction again, the lid 2 comes to automatically fit into the hole 25.

Figure 8B:
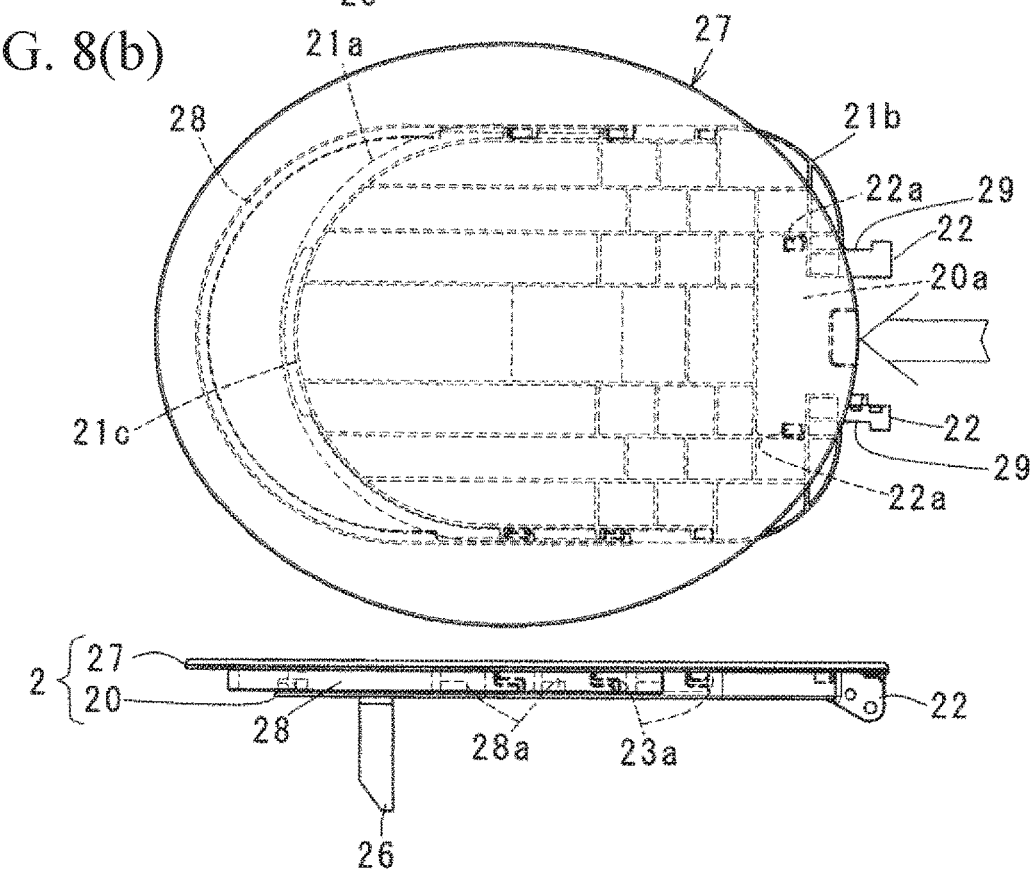
FIG. 8(b) is a top view and a side view of an abnormal state wherein the lid outer is moved in a direction of deviating from the state in FIG. 8(a) by receiving a load in an arrow direction, i.e. an excessive open state.

Thirdly, almost simultaneously, in the structure, when the lid 2 turns in the opening direction further from the state in FIGS. 2(a) and 2(b), the lid outer 27 forming the lid 2 abuts against the link members 5 and 6, the base member 4, the body of the auto body, and the like, and receives an external force in an arrow direction in FIG. 8(b). As a result, in the lid outer 27, the engaged portions 28a are disengaged from the locking piece portions 23a, and the elastic projections 29 are disengaged from the notch portions 22a, so that the lid outer 27 falls off from the lid main member 20, or moves in a direction of separating from the first and second link members 5 and 6. Consequently, in the structure, even if the lid 2 excessively turns in the opening direction further from the fully open position, the external force applied to the lid outer 27 is mitigated and absorbed, thereby preventing or minimizing the damage on the lid outer 27, the body of the auto body, and the like. Furthermore, in the structure, a user has an advantage such that since the lid outer 27 comes off from the lid main member 20, or moves in the direction of separating from the first and second link members 5 and 6, an abnormal situation can become visually recognizable instantly.

Incidentally, in the structure, even if the lid outer 27 comes off from the lid main member 20, the lid outer 27 can be easily assembled relative to the lid main member 20 as mentioned above by the engagement between the respective locking piece portions 23a and the engaged portions 28a, and the engagement between the respective notch portions 22a and the elastic projections 29.

As described above, the vehicle lid device according to the present invention can be variously modified except for specified requirements within a range described in the invention. For example, as for the lid 2, the outer lid 27 moves in the direction of separating from the link members 5 and 6 so as to come off from the lid main member 20; however, it is further preferable that the outer lid 27 is formed in such a way so as not to come off unintentionally.

Also, the first link member 5 includes the holes 55, and the pins 8 are mounted into the corresponding insertion holes 46 of the base member 4 through the holes 55 using the pin members 8 which are the shafts; however, in place of the holes 55 and the pins 8, shafts such as the shafts 64 and 65 can be provided so as to directly fit into the holes 46 on the base member side.

Also, as for an opening/closing operation of the lid 2, it is not limited to the embodiment, and for example, it can be formed such that the lid 2 slightly turns in the opening direction by the urging force of the urging member by unlocking the lock device (not shown in the drawings) in the closed position as well. As for a structural example thereof, see a vehicle lid device filed on the same day. Furthermore, in a case of being simplified, for example, the fixture frame 3 may be omitted, and the base member 4 may be directly supported by the corresponding concave portion (a shape of the concave portion becomes a shape such that the fixture frame 3 is mounted on the concave portion 14) of the housing 1 as well.

EXPLANATION OF SYMBOLS

1 . . . a housing
2 . . . a lid (20 is a lid main member, and 27 is a lid outer)
3 . . . a fixture frame (30 is a bottom wall, 31 is side walls, and 34 is engagement grooves)
4 . . . a base member (40 is a main member, 41 is side walls, and 43 is elastic locking pieces)
5 . . . a first link member (50 is a plate portion, and 51 is leg portions)
6 . . . a second link member (60 is an upper portion, and 61 is a lower portion)
7 . . . an urging member (7a is a winding portion, 7b is one end, and 7d is the other end)
8 . . . pins (corresponding to shafts)
9 . . . a body of an auto body
10 . . . a cylindrical portion (14 is a concave portion)
12 . . . a space for a fueling port or an electrical charging port
20 . . . a lid main member (22 is arm portions)
24 . . . holes (24a is groove portions)
25 . . . holes
26 . . . groove portions
27 . . . a lid outer (28 is a rib, and 28a is engaged portions)
35 . . . pin insertion holes
46 . . . pin insertion holes
47 . . . shaft holes
54 . . . shafts (shafts having an approximately D shape in a cross section)
55 . . . holes
56 . . . support shaft portions
64 . . . shafts (shafts having an approximately round shape in a cross section)
65 . . . shafts Incidentally, all contents of the specification, claims, drawings, and abstract of Japanese Patent Applications No. 2017-137908 filed on Jul. 14, 2017 are cited in their entireties herein and are incorporated as a disclosure of the specification of the present invention.

What is claimed is:
1. A vehicle lid device, comprising:
a housing disposing a fueling port or an electrical charging port inside an opening; and
a lid turnably connected to a housing side, and opening and closing the opening of the housing, wherein a connection portion between the housing side and a lid side includes a fitting portion for a shaft and a hole, and in a fully open position of the lid, when an external force at a predetermined value or above is applied in an opening direction to further open the lid, a fitting of the fitting portion is released.

2. A vehicle lid device according to claim 1, wherein the lid is connected and supported relative to the housing through a first link member and a second link member, and when the external force at the predetermined value or above is applied, a fitting of the fitting portion between the second link member and the lid is released, and a fitting of the fitting portion between the first link member and the lid is maintained.

3. A vehicle lid device according to claim 2, further comprising an urging member supported in the first link member.

4. A vehicle lid device according to claim 2, wherein as the shaft, the first link member includes a shaft having an approximately D shape in a cross section, and the second link member includes a shaft having an approximately round shape in a cross section which can be released from the fitting easier than the D shape.

5. A vehicle lid device according to claim 4, further comprising a groove portion provided on the lid side for allowing the shaft of the second link member to fit again from a state wherein the shaft of the second link member has come off from the hole portion.

6. A vehicle lid device according to claim 2, wherein the lid includes a lid main member to which the first and second link members are connected, and a lid outer mounted on an outer face of the lid main member, and in a case wherein an external force at a predetermined value or above in an opening direction is applied to the lid main member, the lid outer falls off from the lid main member, or moves in a direction of separating from the first and second link members.

* * * * *